United States Patent
Abad et al.

(10) Patent No.: US 12,039,543 B2
(45) Date of Patent: Jul. 16, 2024

(54) SYSTEM AND METHOD FOR ESTABLISHING SECURE TRANSACTIONS AMONG A GROUP OF TRANSACTING PARTIES

(71) Applicant: Capital One Services, LLC, McLean, VA (US)

(72) Inventors: Fardin Abdi Taghi Abad, Seattle, WA (US); Kate Key, Effingham, IL (US); Vincent Pham, Champaign, IL (US); Kenneth Taylor, Champaign, IL (US); Mark Watson, Sedona, AZ (US); Reza Farivar, Champaign, IL (US); Anh Truong, Champaign, IL (US); Jeremy Goodsitt, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 268 days.

(21) Appl. No.: 16/828,713

(22) Filed: Apr. 6, 2020

(65) Prior Publication Data
US 2021/0304214 A1    Sep. 30, 2021

(51) Int. Cl.
*G06Q 20/42* (2012.01)
*G06Q 20/38* (2012.01)
*H04L 9/14* (2006.01)

(52) U.S. Cl.
CPC ......... *G06Q 20/425* (2013.01); *G06Q 20/382* (2013.01); *H04L 9/14* (2013.01);
(Continued)

(58) Field of Classification Search
CPC .............. G06Q 20/382; G06Q 2220/00; H04L 2209/46
See application file for complete search history.

(56) References Cited

U.S. PATENT DOCUMENTS 5,774,553 A    6/1998  Rosen
6,078,898 A    6/2000  Davis et al.
(Continued)

FOREIGN PATENT DOCUMENTS

| KR | 20180048426 A | * | 11/2017 | ............. G06F 21/56 |
| WO | WO-0111448 A2 | * | 2/2001 | ......... G06Q 20/0855 |
| WO | WO-2017001872 A1 | * | 1/2017 | |

OTHER PUBLICATIONS

Bogdanov, Dan et al., "Deploying secure multi-party computation for financial data analysis", 2012, Cybernetica, University of Tartu and Software Technology and Applications Competence Centre, entire document. (Year: 2012).*

*Primary Examiner* — Christopher Bridges
(74) *Attorney, Agent, or Firm* — HUNTON ANDREWS KURTH LLP

(57) ABSTRACT

Systems and methods are presented for establishing secure transactions among a group of transacting parties through use of multi-party computation including garbled circuits. The system uses a set of distributed garbled circuit servers, each having a garbled circuit module, to collectively and securely perform a transactional function, such that any party only has access to its own input and output. Each garbled circuit module may receive input financial data for a transacting party and financial data for at least one other transacting party, and perform an operation to obtain output financial data. The operation may relate to a function for determining a plurality of financial transactions among the plurality of transacting parties.

20 Claims, 13 Drawing Sheets

(52) U.S. Cl.
CPC ...... *G06Q 2220/00* (2013.01); *H04L 2209/16* (2013.01); *H04L 2209/46* (2013.01); *H04L 2209/56* (2013.01)

(56) References Cited

U.S. PATENT DOCUMENTS

| | | |
|---|---|---|
| 6,968,314 B1 | 11/2005 | White et al. |
| 7,835,962 B1 | 11/2010 | Sandoval |
| 8,131,627 B2 * | 3/2012 | Sadre .................... G06Q 40/04 705/37 |
| 9,736,128 B2 * | 8/2017 | Premnath .............. H04L 63/062 |
| 9,898,781 B1 | 2/2018 | Silverman |
| 2002/0077971 A1 | 6/2002 | Allred |
| 2002/0174066 A1 | 11/2002 | Kleckner et al. |
| 2003/0074276 A1 | 4/2003 | Sato |
| 2004/0117316 A1 | 6/2004 | Gillum |
| 2004/0215565 A1 | 10/2004 | Huffman |
| 2005/0075974 A1 | 4/2005 | Turgeon |
| 2005/0096986 A1 | 5/2005 | Taylor et al. |
| 2008/0167883 A1 | 7/2008 | Thavildar Khazaneh |
| 2008/0270206 A1 | 10/2008 | Gillum |
| 2009/0076951 A1 | 3/2009 | Szamel |
| 2010/0250406 A1 | 9/2010 | Clark et al. |
| 2011/0313920 A1 | 12/2011 | Trickel |
| 2013/0218770 A1 | 8/2013 | Prather et al. |
| 2014/0195420 A1 | 7/2014 | Trickel |
| 2015/0186844 A1 | 7/2015 | Trickel |
| 2015/0193886 A1 | 7/2015 | Trickel |
| 2015/0213409 A1 | 7/2015 | Trickel |
| 2017/0359321 A1 * | 12/2017 | Rindal .................. G06F 21/602 |
| 2018/0039961 A1 | 2/2018 | Blouin et al. |
| 2018/0053160 A1 | 2/2018 | Schwartz et al. |
| 2020/0204346 A1 * | 6/2020 | Trevethan ............. H04L 9/3271 |
| 2020/0220851 A1 * | 7/2020 | Storm .................. H04L 9/0625 |
| 2020/0226284 A1 * | 7/2020 | Yin .................... G06F 21/6254 |
| 2020/0228313 A1 * | 7/2020 | Storm ................ H04L 63/0428 |

* cited by examiner

System 100(A)

System 100(B)

|   |   |   |   |
|---|---|---|---|
| $X_{1N}$ | $X_{2N}$ | $\ldots$ | $0$ |
| $\ldots$ | $\ldots$ | $0$ | $\ldots$ |
| $X_{12}$ | $0$ | $\ldots$ | $X_{N2}$ |
| $0$ | $X_{21}$ | $\ldots$ | $X_{N1}$ |

FIG. 5B

|   |   |   |   |
|---|---|---|---|
| $X_{1N}$ | $X_{2N}$ | $\ldots$ | $X_{NN}$ |
| $\ldots$ | $\ldots$ | $\ldots$ | $\ldots$ |
| $X_{12}$ | $X_{22}$ | $\ldots$ | $X_{N2}$ |
| $X_{11}$ | $X_{21}$ | $\ldots$ | $X_{N1}$ |

FIG. 5A

SYSTEM AND METHOD FOR ESTABLISHING SECURE TRANSACTIONS AMONG A GROUP OF TRANSACTING PARTIES

FIELD OF THE DISCLOSURE

The present disclosure relates generally to secure computing technology and, more specifically, to an exemplary system and method for establishing secure transactions among a group of transacting parties.

BACKGROUND

Transacting parties may resolve payments for their transactions, or resolve debts between parties, through payments (such as electronic funds transfers) made via a central clearinghouse, such as the Automated Clearing House (ACH) administered by the National Automated Clearing House Association (NACHA). Financial institutions may use the ACH to transfer funds between and among other financial institutions to settle transactions or amounts owed from one financial institution to another.

However, there is a drawback involved in using a central clearinghouse, such as the ACH, for transferring funds between parties. There is a lack of complete privacy or confidentiality among the transacting parties, since the central clearinghouse obtains details about the transactions, such as the amount of payments made and the identity of the parties making and receiving payments.

Thus, it may be beneficial to provide exemplary systems and methods that may establish transactions, such as clearing transactions, without a single party having all of the transaction details, to overcome at least some of the deficiencies described herein.

SUMMARY

Aspects of the disclosed technology include systems and methods for establishing secure transactions among a group of transacting parties. Secure transactions may be provided in the context of using multi-party computation techniques, including garbled circuit modules, to collectively and securely perform a transactional function. In this way, a set of transactions may be established among a group of transacting parties without any party knowing all details of each transaction.

Embodiments of the present disclosure provide a system for secure transactions, comprising a set of N distributed servers, each server configured for data communication via a network, each server of the set of N servers comprising a processor and a garbled circuit module comprising code for execution by the processor, wherein N is an integer greater than 2; wherein, for each server of the set of N servers, the respective garbled circuit module is configured to, when executed: receive input financial data associated with one of a plurality of transacting parties; transmit, via the network, at least a portion of the input financial data to at least one other server of the set of N servers, said transmitted financial data encrypted for use by the respective garbled circuit module of each receiving server; receive, via the network, financial data associated with at least one other transacting party from at least one other server of the set of N servers, said received financial data encrypted for use by the garbled circuit module; and perform an operation to obtain output financial data using the input financial data and the received financial data; wherein, the processor is further configured to execute a financial transaction based on a portion of the output financial data relating to the one of the plurality of transacting parties; and wherein, the operation relates to a function for determining a plurality of financial transactions among the plurality of transacting parties.

Embodiments of the present disclosure provide a method for establishing a secure transaction system, comprising: compiling, using a garbled circuit compiler, code implementing a transactional function $f_N(x)$ to obtain a set of N garbled circuit modules, each garbled circuit module of the set of N garbled circuit modules comprising code executable by a processor, wherein N is an integer greater than 2; and distributing the set of N garbled circuit modules among a set of N servers, each server of the set of N servers comprising a processor for executing one of the set of N garbled circuit modules; wherein the transactional function $f_N(x)$ relates to a function for determining a plurality of financial transactions between a group of N transacting parties based on financial data associated with the group of N transacting parties, and wherein each server of the set of N servers is configured for data communication, via a network, with at least one other server of the set of N servers.

Embodiments of the present disclosure provide a method for conducting secure transactions, comprising: receiving financial data comprising an amount owed to each of a group of N financial institutions, wherein N is an integer greater than 2; providing the received financial data to a garbled circuit module, the garbled circuit module comprising code for one of a set of N distributed garbled circuit modules generated to collectively perform a transactional function $f_N(x)$, the garbled circuit module configured for execution by a processor to: transmit to at least one other garbled circuit module of the set of N distributed garbled circuit modules at least a portion of the received financial data, the transmitted financial data encrypted for use by the respective receiving garbled circuit module; receive from at least one other garbled circuit module of the set of N distributed garbled circuit modules financial data encrypted for use by the garbled circuit module; and perform a mathematical operation to obtain output financial data comprising a settlement amount to be paid to each of the group of N financial institutions, the mathematical operation relating to the transactional function $f_N(x)$; initiating execution of the garbled circuit module; receiving from the garbled circuit module the output financial data; and executing a plurality of settlement transactions, each of the settlement transactions comprising a payment of the settlement amount to one of the respective group of N financial institutions according to the received output data; wherein the transactional function $f_N(x)$ comprises a function for determining settlement payments to be made by a plurality of financial institutions of a group of N financial institutions to satisfy amounts owed among the group of N financial institutions.

Further features of the disclosed design, and the advantages offered thereby, are explained in greater detail hereinafter with reference to specific example embodiments described below and illustrated in the accompanying drawings.

BRIEF DESCRIPTION OF THE DRAWINGS

FIGS. 5A-5F illustrate a transactional function used in a secure transaction system according to one or more example embodiments.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for establishing secure transactions among a group of transacting parties through use of multi-party computation including garbled circuits to collectively and securely perform a transactional function. Benefits of the disclosed technology may include improved privacy and security, as a set of transactions may be established among a group of transacting parties without any party knowing all details of each transaction.

Figure 1A:
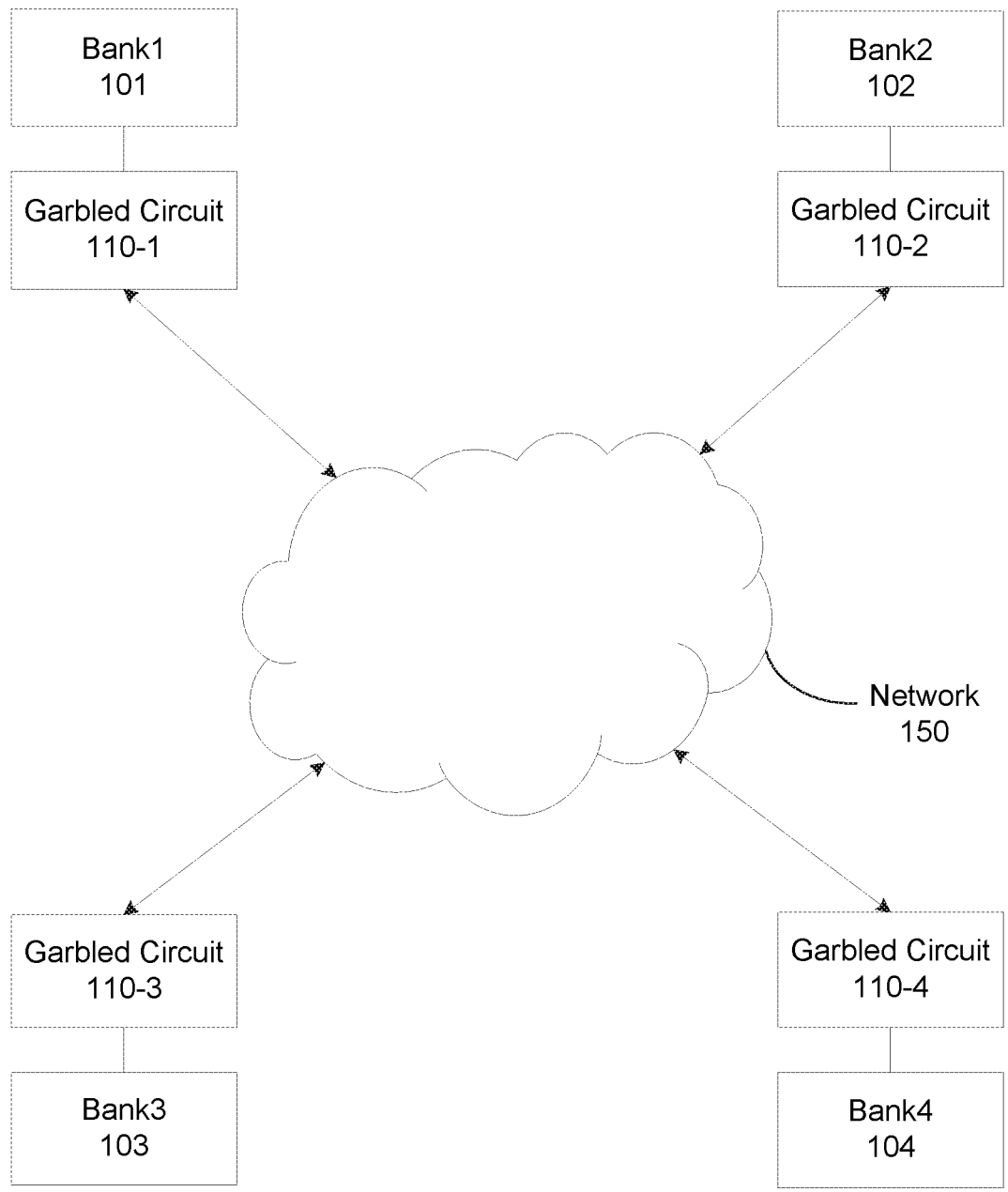
FIGS. 1A-1B provide a diagram illustrating a secure transaction system according to one or more example embodiments.
Figure 1B:
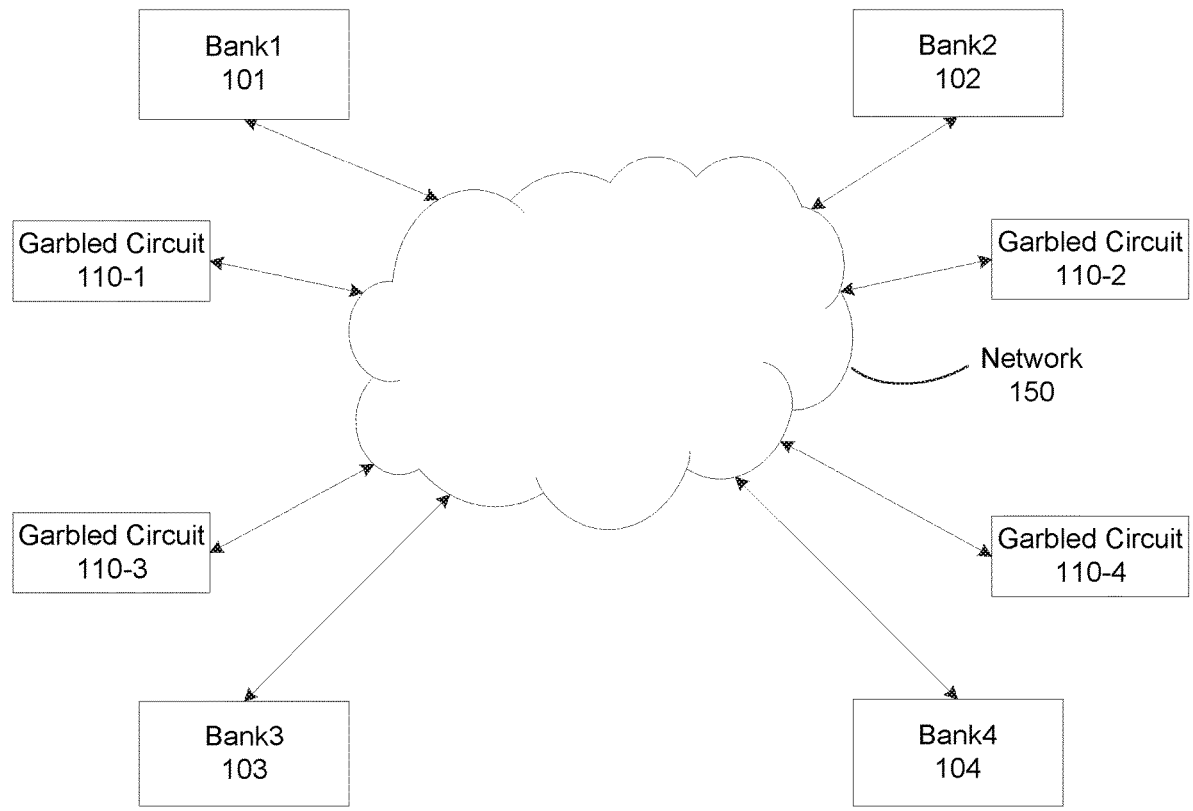

FIGS. 1A-1B illustrate secure transaction system 100 (depicted as system 100(A) and system 100(B) in the figures, respectively) according to one or more example embodiments. Although FIGS. 1A-1B illustrate certain components, system 100 may include additional or multiple components connected in various ways. It is understood that not all embodiments necessarily include every component shown in FIGS. 1A-1B.

System 100 may include a set of N garbled circuit servers 110-1, 110-2, 110-3, 110-4, 110-n, . . . 110-N etc. (a set of 4 garbled circuit servers is shown for illustrative purposes in FIGS. 1A-1B). Each garbled circuit server 110-n may communicate with one or more of the other garbled circuit servers via network 150. Each garbled circuit server 110-n may be associated with one of a group of N transacting parties (four transacting parties, identified as Bank1 101 through Bank4 104, are shown for illustrative purposes in FIGS. 1A-1B). Each of the group of N transacting parties may have one or more transactions to be carried out between or among one or more other parties of the group of transacting parties. One or more of the transacting parties, or each party of the group of N transacting parties, may be a financial institution, such as a bank, a commercial or business entity, or another private or public entity.

The set of garbled circuit servers 110-1, 110-2, 110-3, 110-4, 110-n, . . . 110-N etc. may be configured to collectively and securely perform a transactional function $f_N(x)$, where the transactional function $f_N(x)$ may relate to one or more transactions between or among two or more transacting parties of the group of N transacting parties, using secure multi-party computation including garbled circuit techniques. Secure multi-party computation utilizes computational methods for a group of parties to jointly evaluate or apply a function to inputs from the group of parties, while keeping each party's input confidential or private to that party. A garbled circuit provides a structure or protocol for handling secure multi-party computation to jointly evaluate or apply a function among a group of parties, using Boolean operations.

Each of the group of N transacting parties may have a separate server or backend processing system in data communication with a respective garbled circuit server 110-n. As illustrated in FIG. 1A, in some embodiments a separate server or backend processing system for each transacting party (shown as Bank1 101 through Bank4 104) may be connected with an associated garbled circuit server 110-n. In some embodiments, the associated garbled circuit server 110-n may be integrated with the server or backend processing system of the transacting party. As illustrated in FIG. 1B, in some embodiments a separate server or backend processing system for each transacting party (shown as Bank1 101 through Bank4 104) may communicate with the associated garbled circuit server 110-n via network 150. Communications between a transacting party (e.g., by a separate server or backend processing system for the transacting party) and the associated garbled circuit server may be encrypted using any suitable cryptographic method.

A server or backend processing system as referenced herein may include one or more processors such as, e.g., a microprocessor, RISC processor, ASIC, etc., along with associated processing circuitry, which are coupled to memory storing executable instructions and/or data. A server or backend processing system may be configured as a central system, server or platform to control and call various data at different times to execute a plurality of workflow actions. A server may be a dedicated server computer, such as bladed servers, or may be one or more personal computers, laptop computers, notebook computers, palm top computers, network computers, mobile devices, or any processor-controlled device capable of supporting the features of any server as described herein. Similarly, a backend processing system may be one or more personal computers, laptop computers, notebook computers, palm top computers, network computers, mobile devices, or any processor-controlled device capable of supporting the features of any backend processing system as described herein. A server or backend processing system may include one or more software applications or executable program code to be executed on a processor and configured to carry out features described herein for such server. Memory included in a server or backend processing system may include read-only memory, write-once read-multiple memory and/or read/write memory, e.g., RAM, ROM, and EEPROM, including any combination thereof, and may store executable instructions and/or data, as may be necessary or appropriate to control, operate or interface with the other features of the server or backend processing system, including any applications running on the server or backend processing system. Additional details or features of garbled circuit server 110-n are further described below with reference to FIG. 2.

A server or backend processing system as referenced herein may be configured for data communication with other devices via a network such as network 150. A server or backend processing system may communicate, send or receive messages, requests, notifications, data, etc. to/from other devices. A server or backend processing system may also include a communications interface that may include wired or wireless data communication capability. These capabilities may support data communication with network 150 and/or any wired or wireless communication network. Communications between a server or backend processing system and other devices may be encrypted or decrypted using any suitable cryptographic method.

Network 150 may include one or more of a wireless network, a wired network or any combination of wireless network and wired network, and may be configured to connect, for purposes of data communication, one or more devices in system 100. For example, network 150 may include one or more of a fiber optics network, a passive optical network, a cable network, an Internet network, a satellite network, a wired or wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 150 may include, without limitation, telephone lines, fiber optics, IEEE Ethernet 902.3, a wide area network, a wireless personal area network, a LAN, or a global network such as the Internet. In addition, network 150 may support an Internet network, a wireless communication network, a cellular network, or the like, or any combination thereof. Network 150 may further include one network, or any number of the exemplary types of networks mentioned above, operating as a stand-alone network or in cooperation with each other. Network 150 may utilize one or more protocols of one or more network elements to which they are communicatively coupled. Network 150 may translate to or from other protocols to one or more protocols of network devices. Although network 150 is depicted as a single network, it should be appreciated that according to one or more example embodiments, network 150 may comprise a plurality of interconnected networks, such as, for example, the Internet, a service provider's network, a cable television network, corporate networks, credit card association networks, and/or a LAN.

Figure 2:
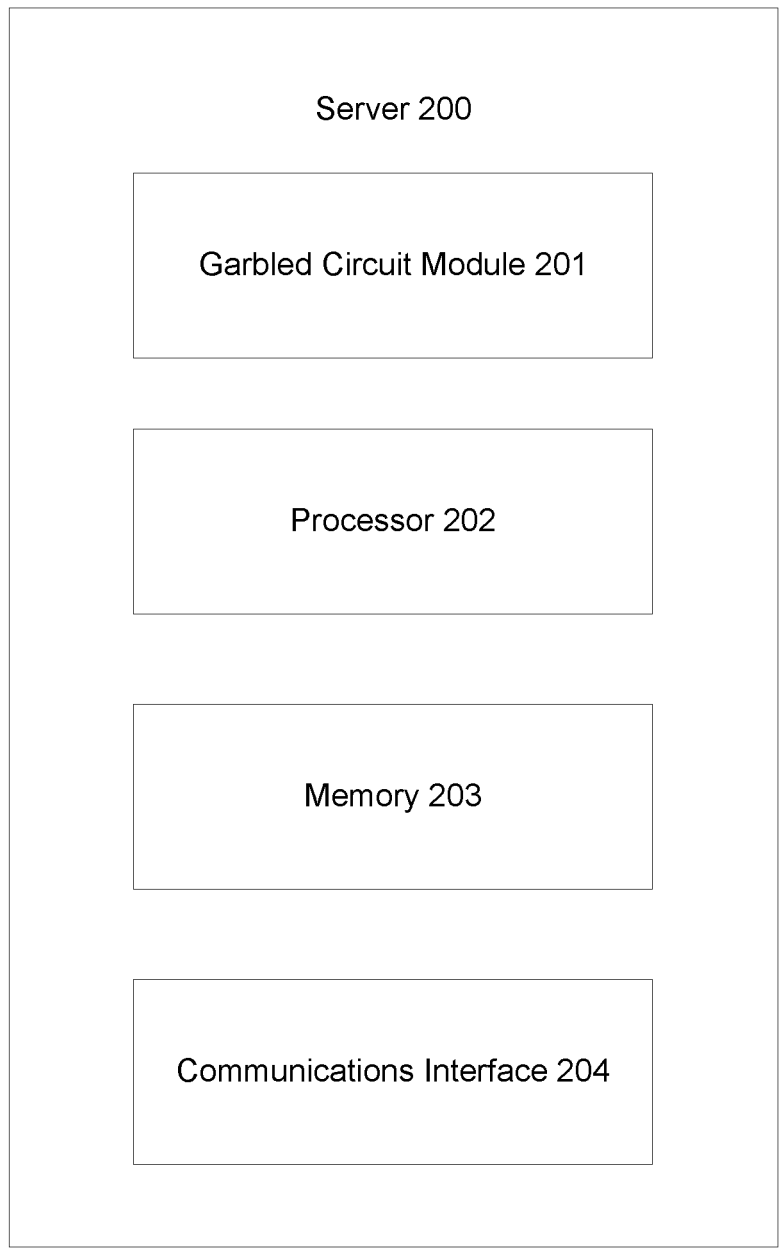
FIG. 2 is a diagram illustrating components of a garbled circuit server used in a secure transaction system according to one or more example embodiments.

FIG. 2 is a diagram illustrating components of a garbled circuit server 200 used in a secure transaction system according to one or more example embodiments. Garbled circuit server 200 may be any one of garbled circuit servers 110-1 through 110-N described above with reference to FIGS. 1A-1B. Garbled circuit server 200 may include garbled circuit module 201, processor 202, memory 203, and communications interface 204. It is understood that not all embodiments necessarily include every component shown in FIG. 2. It is also understood that, while FIG. 2 depicts a single instance of each component, embodiments may contain multiple instances of any components.

Garbled circuit module 201 may include a software application or executable program code stored in memory 203 to be executed on processor 202, and be configured to carry out features described herein for any of the garbled circuit servers. Garbled circuit module 201 may further be configured to transmit and/or receive data with other devices (e.g., any of the set of garbled circuit servers) via communications interface 204. Garbled circuit module 201 may be constructed according to the procedures described below with reference to FIG. 3. Further features of garbled circuit module 201 are described below.

Processor 202 may include one or more processing devices such as a microprocessor, RISC processor, ASIC, etc., and may include associated processing circuitry. Processor 202 may include, or be connected to, memory (such as memory 203) storing executable instructions and/or data, as may be necessary or appropriate to control, operate or interface with the other features of system 100, including garbled circuit module 201 or any other applications running on system 100. Processor 202 (including any associated processing circuitry) may contain additional components including processors, memories, error and parity/CRC checkers, data encoders, anticollision algorithms, controllers, command decoders, security primitives and tamper-proofing hardware, as necessary to perform the functions described herein.

Memory 203 may include read-only memory, write-once read-multiple memory and/or read/write memory, e.g., RAM, ROM, and EEPROM, including any combination thereof. Memory 203 may store executable instructions and/or data, as may be necessary or appropriate to control, operate or interface with the other features of system 100, including garbled circuit module 201 or any other applications running on system 100.

Communications interface 204 may include wired or wireless data communication capability. Communications interface 204 may be configured for data communication between components of system 100 and other devices, such as, e.g., servers, back-end systems, mobile devices, etc., over a network and protocol common to such devices. These capabilities may support data communication with a wired or wireless communication network, including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a WiFi network or corporate LAN). Communications interface 204 may support communication via a short-range wireless communication field, such as Bluetooth, NFC, or RFID, and may include a reader, such as a NFC reader.

Communications between components of system 100 and other devices may be encrypted or decrypted using any suitable cryptographic method. In some embodiments, processor 202 may encrypt data prior to transmitting data to other devices, using any suitable cryptographic method. Communication between devices may include any methods used for data communication over a network, including, for example, a text message, an e-mail, or other messaging techniques appropriate in a network-based configuration. Communication methods may include an actionable push notification with an application stored on a mobile device.

Figure 3:
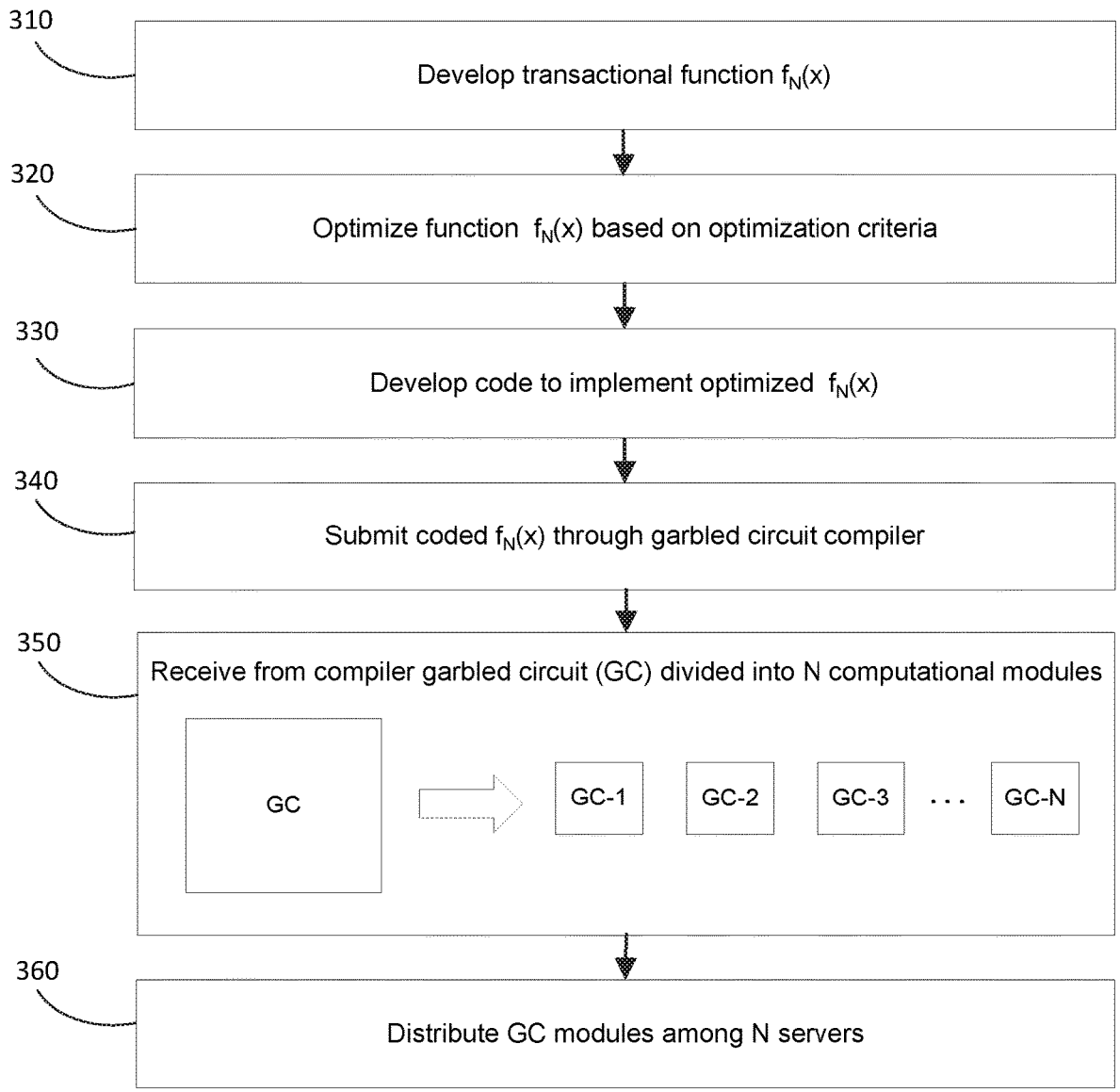
FIG. 3 is a diagram illustrating a method of establishing a secure transaction system according to one or more example embodiments.

FIG. 3 is a diagram illustrating a method 300 of establishing a secure transaction system according to one or more example embodiments, with reference to components and features described above including but not limited to the figures and associated description. Method 300 may be carried out, e.g., by a secure transaction system administrator, or by any party desiring to establish a secure transaction system.

At block 310, a transactional function $f_N(x)$ may be developed for use in establishing one or more transactions between or among two or more transacting parties of the group of N transacting parties. Transactional function $f_N(x)$ may be developed to operate on input values $x_1, x_2, \ldots x_N$ respectively from the group of N transacting parties and provide output values $y_1, y_2, \ldots y_N$ for the group of N transacting parties respectively, such that $[y_1, y_2, \ldots$ $y_N$]=f([$x_1, x_2, \ldots x_N$]), where [$x_1, x_2, \ldots x_N$] and [$y_1, y_2, \ldots y_N$] may each be represented as an array of input and output values, respectively. Each input value $x_1, x_2, \ldots x_N$ may itself be a single value or an array of values, and correspondingly each output value $y_1, y_2, \ldots y_N$ may itself be a single value or an array of values.

Examples of a transactional function $f_N(x)$ may include a function for determining an amount owed by each transacting party to each other transacting party. Other examples of a transactional function $f_N(x)$ may include a function to: predict payments that may become due in the future, such as, e.g. recurring payments; determine and arrange pre-payments of amounts that are or may become due; determine a risk based on amounts owed or that may become due, which may include developing or monitoring a risk profile for individual transacting parties based on the amounts owed or that may become due or other risk indicators for each of the transacting parties; or minimize risk by organizing transactions to maximize cash flow to parties requiring higher cash flow.

At block 320, an optimized transactional function $f_N(x)$ may be developed based upon optimization criteria. Optimization criteria may include one or more of minimizing the number of transactions to be made, minimizing the total transaction costs for the transactions to be made, minimizing the risk involved in carrying out the transactions, maximizing the speed at which the transactional function may be performed, or other optimization criteria.

For the example of a transactional function for determining an amount owed by each transacting party to each other transacting party, an optimized function may minimize the total number of payments to be made by combining and/or netting certain of the payments to be made between parties. Additional details about the optimized transactional function are further described below with reference to FIGS. 5A-5F.

More generally, an optimized function to minimize the number of transactions to be carried out among N transacting parties may be represented mathematically as follows:

Let $x(i,j)$=the original amount (net) owed by party i to party j (before optimization), and
$d(i,j)$=the amount (net) to be paid by party i to party j (after combining transactions)

Define:

$$R[d(i,j)] = \begin{cases} 0, & \text{for } d(i,j) = 0 \\ 1, & \text{for } d(i,j) > 0 \end{cases}$$

The element $R[d(i,j)]$ is defined to reflect the existence of a transaction. If $d(ij)=0$, meaning no amount would be paid from party i to party j, then no transaction is required between that party i and party j, and the value $R[d(i,j)]$ for that (i,j) is 0. If $d(i,j)>0$, meaning an amount would be paid from party i to party j, then one transaction is required between that party i and party j, and the value $R[d(i,j)]$ for that (i,j) is 1.

Optimization function:

$$y = \min \Sigma_{i=1}^{N} \Sigma_{j=1}^{N} R[d(i,j)] \quad [1]$$

Such that:

$$\Sigma_{j=1}^{N} d(i,j) = \Sigma_{j=1}^{N} x(i,j) \text{ for each } i=1,\ldots,N \quad [2]$$

The optimization goal is to minimize the number of transactions required to have all amounts owed by transacting parties to other transacting parties paid (i.e., settled). According to Equation [1], the optimization goal is met when the sum of $R[d(i,j)]$ values for all i's and j's is minimized, subject to satisfying the condition of Equation [2]. According to equation [2], for each party i, the sum of all $x(i,j)$ must equal the sum of all $d(i,j)$. This means the sum of amounts (net) originally owed by party i to the other transacting parties j [the $x(i,j)$ summed for all j] is equal to the amounts (net) determined to be paid by party i to the other transacting parties j. As a result of the condition of Equation [2], each party i would pay the same total amount as the sum of amounts originally owed by that party i. As a result of the optimization of Equation 1, the total number of transactions (i.e., payments) would be minimized, although the payments may individually be set for different amounts and to different parties j than the original amounts owed by party i. In some embodiments, additional criteria may be added, for example providing a cap (i.e., maximum amount) on the amount that any one party would pay any other single party.

Regarding the example of a transactional function for determining an amount owed by each transacting party to each other transacting party, another optimized function may minimize the total transactional cost of payments to be made, where each transaction has an associated cost. More generally, an optimized function to minimize the number of transactions to be carried out may be represented mathematically as follows, using the same definitions and nomenclature as above with reference to Equations [1] and [2].

Let $c(i,j)$=the cost of completing a payment transaction from party i to party j.

Optimization function:

$$y = \min \Sigma_{i=1}^{N} \Sigma_{j=1}^{N} c(i,j) * R[d(i,j)] \quad [3]$$

Such that:

$$\Sigma_{j=1}^{N} d(i,j) = \Sigma_{j=1}^{N} x(i,j) \text{ for each } i=1,\ldots,N \quad [\text{same as 2}]$$

The optimization goal is to minimize the total cost of transactions required to have all amounts owed by transacting parties to other transacting parties paid (i.e., settled). According to Equation [3], the optimization goal is met when the sum of $c(i,j)*R[d(i,j)]$ values for all i's and j's is minimized, subject to satisfying the condition of Equation [2]. As described above, Equation 2 requires that each party i would pay the same total amount as the sum of amounts originally owed by that party i. As a result of the optimization of Equation [3], the total cost of transactions (i.e., cost of making payments) would be minimized, although the payments may individually be set for different amounts and to different parties j than the original amounts owed by party i. As will be understood, other methods of optimization, based on the same or different optimization criteria, may be incorporated into the transactional function $f_N(x)$. In some embodiments, the transactional function $f_N(x)$ may be a combination of other transactional functions.

At block 330, code to implement the transactional function $f_N(x)$ may be developed using any suitable computer programming language, such as C or Python. Preferably, the computer programming language used would be compatible with a garbled circuit compiler, such that the code developed at this block would not need to be converted to a compatible programming language. In some embodiments, transactional function $f_N(x)$ may be optimized (as discussed above) before developing the implementing code; in some embodiments, transactional function $f_N(x)$ may not go through any optimization process before developing the implementing code.

At block 340, the code to implement the transactional function $f_N(x)$ is submitted through a garbled circuit compiler suitable for generation of N garbled circuit modules or units. In some embodiments, the transactional function $f_N(x)$ as submitted may be optimized.

At block 350, a set of N garbled circuit modules or units may be received as output from the garbled circuit compiler. In some embodiments, the N garbled circuit modules or units may be received in executable form (e.g., N files of executable code, each file representing one garbled circuit module). In some embodiments, the N garbled circuit modules or units may be received in intermediate form (e.g., as a set of N files containing C code, or as a set of N Boolean circuits), to be further converted or programmed into an appropriate language, such as C, Python, Java, etc. and then compiled or converted into executable code for each of the N garbled circuit modules. Each garbled circuit module may include a set of executable instructions including a sequence of instructions prescribing (a) receiving data and performing computations, (b) interactions for each garbled circuit module with the other garbled circuit modules and (c) exchange of data by each garbled circuit module with the other garbled circuit modules. Thus, for example, garbled circuit module instructions may tell the module or server to receive data from a transacting party or from another garbled circuit server, send data to another garbled circuit server, perform a computation, or send a result to another garbled circuit server or to a transacting party.

At block 360, the set of N garbled circuit modules may be distributed among N garbled circuit servers, such that each garbled circuit module (e.g., garbled circuit module 201) would be executed by a processor (e.g., processor 202) in a garbled circuit server (such as server 200). Each of the N garbled circuit servers may further be distributed over a network and associated with a transacting party, as described above with reference to FIGS. 1A-1B. In some examples, each transacting party may be one or more trusted servers within the N garbled circuit servers and may be executing the methods described herein, and there are no other servers other than the transacting parties.

Figure 4A:
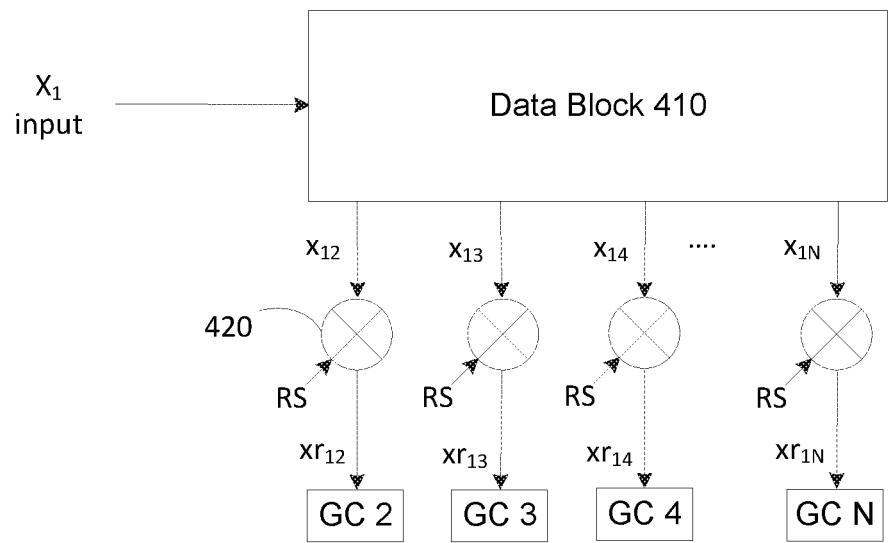
FIGS. 4A-4B illustrate garbled circuit module operations according to one or more example embodiments.
Figure 4B:
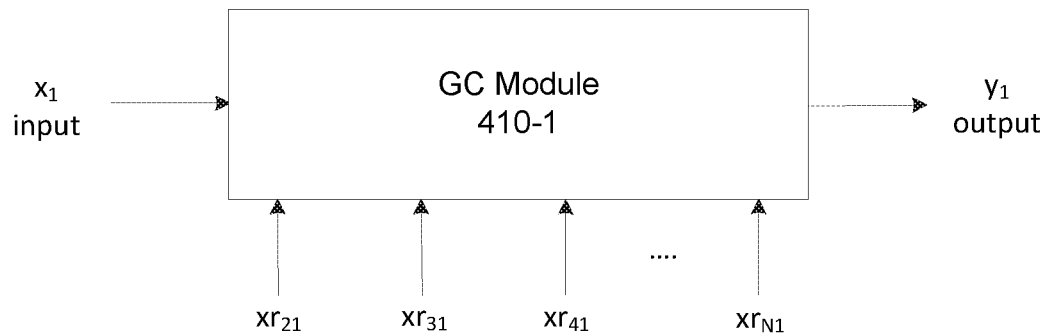

FIGS. 4A-4B illustrate garbled circuit module operations according to one or more example embodiments, with reference to components and features described above including but not limited to the figures and associated description. The garbled circuit module operations may be carried out by components of system 100 including, e.g., by server 200 via garbled circuit module 201 executing in conjunction with processor 202. The garbled circuit module operations may be performed as part of a collective function carried out by a set of N distributed servers 200, each server 200 having a garbled circuit module 201 executing in conjunction with a processor 202.

As shown in FIG. 4A, input data $x_1$ may be received into data block 410 (part of a garbled circuit module, GC1). The input data $x_1$ may be a value or an array of values. The input data $x_1$ in data block 410 may be apportioned into N−1 individual portions denoted as $x_{12}, x_{13}, x_{14}, \ldots x_{1N}$, respectively. Each individual portion $x_{12}, x_{13}, x_{14}, \ldots x_{1N}$ may be combined with a pair of random strings RS using logical operator 420 (part of GC 1 or part of each corresponding GC). One of the pair of random strings RS may correspond to a Boolean value 1 and the other of the pair of random strings RS may correspond to a Boolean value 0. Each binary bit (1 or 0) in each individual portion $x_{12}, x_{13}, x_{14}, \ldots x_{1N}$ may be replaced with a corresponding random string, such that the true value of each individual portion $x_{12}, x_{13}, x_{14}, \ldots x_{1N}$ cannot be known to other transacting parties. For example, the random string A random string can be any of bit long in binary format, for example, 128 bit. Although the random string pair RS is show as the same for each individual portion $x_{12}, x_{13}, x_{14}, \ldots x_{1N}$, the random string pair RS can be different for each individual portion $x_{12}, x_{13}, x_{14}, \ldots x_{1N}$. The random string pair RS may be randomly generated by logical operator 420. Random string RS may be a string of random bits or characters of length equal to each individual data portion. Logical operator 420 may be a Boolean operation such as AND, OR, XOR, etc. As result, the result of each logical operator $xr_{12}, xr_{13}, xr_{14}, \ldots xr_{1N}$ may be presented as random strings that may further be encrypted. The result of each logical operator $xr_{12}, xr_{13}, xr_{14}, \ldots xr_{1N}$ may be provided to one of other garbled circuit modules GC2, GC3, GC4, ... GCN via respective garbled circuit servers of the set of N servers.

The garbled circuit module operations shown in FIG. 4A may be repeated in each of the other garbled circuit modules $GC_2, GC_3, GC_4, \ldots GC_N$. As a result, each garbled circuit module may receive portions of input data from each of the other garbled circuit modules.

After receiving their respective $xr_{12}, xr_{13}, xr_{14}, \ldots xr_{1N}$ from GC1, other transacting parties may employ their respective GC to generate their respective input $xr_{21}, xr_{31}, xr_{41}, \ldots xr_{N1}$ to the GC1, as shown in FIG. 4B. Each $xr_{21}, xr_{31}, xr_{41}, \ldots xr_{N1}$ is random strings that replace its true input value of each transacting party and correspond to the random strings used for each respective $xr_{12}, xr_{13}, xr_{14}, \ldots, xr_{1N}$. For example, each other transacting party may generate their respective input $xr_{21}, xr_{31}, xr_{41}, \ldots xr_{N1}$ by employing oblivious transfers that is known in the art. As a result, the true input value to the GC 1 of each other transacting party cannot be known to other transacting parties. Each $xr_{21}, xr_{31}, xr_{41}, \ldots xr_{N1}$ may be further encrypted.

As shown in FIG. 4B, garbled circuit module 410-1 (i.e. GC1) may receive, in addition to input x1, input values from the other garbled circuit modules $xr_{21}$ (from GC2), $xr_{31}$ (from GC3), $xr_{41}$ (from GC4), ... $xr_{N1}$ (from GCN). Garbled circuit module 410-1 may process input data x1 and the input values $xr_{21}, xr_{31}, xr_{41}, \ldots xr_{N1}$ received from the other garbled circuit modules to obtain output data $y_1$. In some embodiments, the output data $y_1$ may be presented as random strings. The true value of $y_1$ may be further obtained by mapping the random strings of $y_1$ to the corresponding random strings of input $x_1$. Further, the output data $y_1$ or its true value may be transmitted to other transacting parties. For example, in a case where the output data $y_1$ is an array, each component of the output data $y_1$ may be transmitted to each corresponding transacting party. Similarly, each of the other garbled circuit modules GC2, GC3, GC4, ... GCN may each process input data and input values (received from the other garbled circuit modules) to obtain output data $y_2, y_3, \ldots y_N$. Collectively, the processing conducted by the N garbled circuit modules GC1, GC2, GC3, GC4, ... GCN may perform a financial transaction function $f_N(x)$ to yield output data $y_1, y_2, y_3, \ldots y_N$ based on input data $x_1, x_2, x_3, \ldots x_N$. FIGS. 5A-5F illustrate an example of a transactional function $f_N(x)$ used in a secure transaction system according to one or more example embodiments, with reference to components and features described above including but not limited to the figures and associated description. The transactional function $f_N(x)$ as illustrated in FIGS. 5A-5F relates to determining an amount owed by each transacting party to each other transacting party, as optimized for minimizing the total number of settlement payments to be made in satisfying the amounts owed, by combining and/or netting certain of the amounts owed between parties. For purposes of illustration, four transacting parties (N=4) are shown in FIGS. 5A-5F, however the discussion applies to any group of N transacting parties. Transactional function $f_N(x)$ as shown and described with reference to FIGS. 5A-5F may be implemented in code and submitted to a garbled circuit compiler to obtain a set of N garbled circuit modules, as described above with reference to FIG. 3, ultimately to be collectively performed by a set of N garbled circuit servers as described above with reference to FIGS. 1-2 and 4A-4B.

FIG. 5A illustrates a two dimensional array 501. Each element of array 501, $x_{ij}$, represents an original amount owed by party i to party j. Thus, each row of array 501 shows the amounts owed by party i to the other parties, and each column of array 501 shows the amounts owed to party i by the other parties.

FIG. 5B illustrates a two dimensional array 511. Similar to array 501 in FIG. 5A, each element of array 511, $x_{ij}$, represents the original amount owed by party i to party j. Similar to FIG. 5A, each row of array 511 shows the amounts owed by party i to the other parties, and each column of array 511 shows the amounts owed to party i by the other parties. Since a party i would owe nothing to itself, the elements $x_{ii}$ may be set to 0. This is shown in FIG. 5B, where the elements $x_{11}$, $x_{22}$, $x_{33}$ and $x_{44}$ of array 511 have been each set to 0.

Figure 5C:
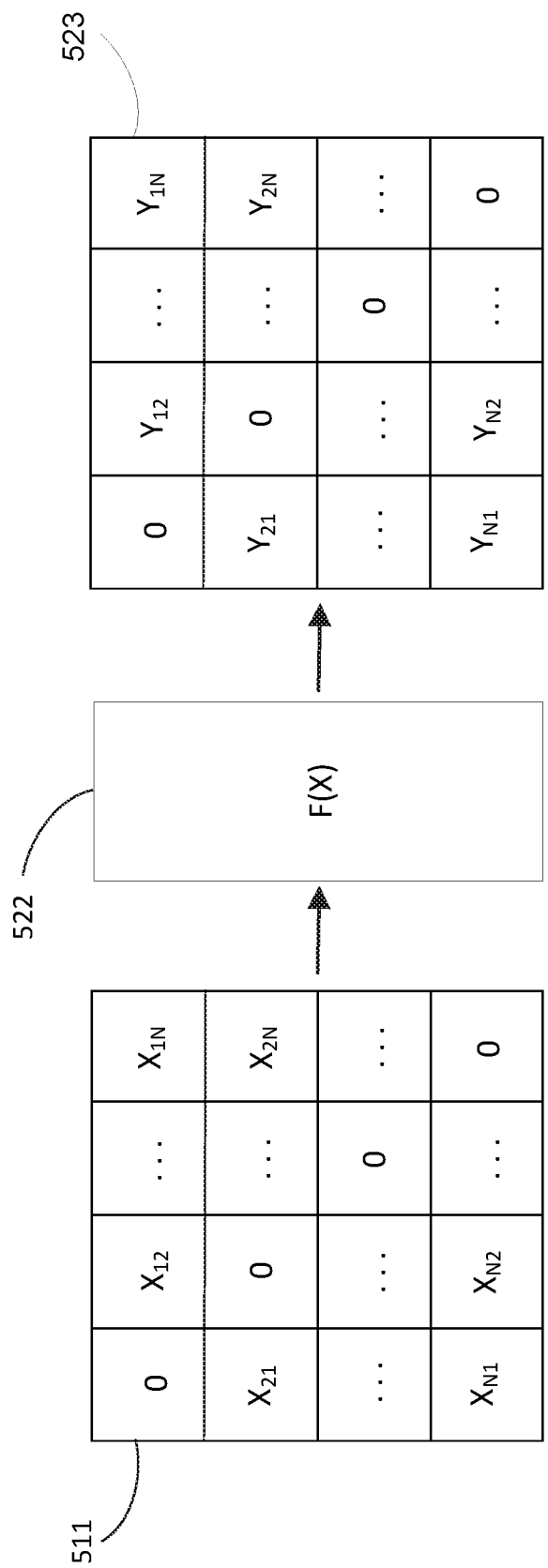

FIG. 5C illustrates schematically the application of an optimizing transactional function 522 on input array 511 (as referenced in FIG. 5B) to produce an output array 523. Input array 511 contains elements $x_{ij}$ representing, as in FIG. 5B, the original amount owed by party i to party j, with elements $x_{ii}$ set to 0. Output array 523 contains elements $y_{ij}$ representing the amount to be paid by party i to party j, based on application of optimizing transactional function 522. Elements $y_{11}$, $y_{22}$, $y_{33}$ and $y_{44}$ have been each set to 0 because, as discussed above, party i would owe nothing to itself—even after optimization. Optimizing transactional function 522 may be denoted $f_N(x)$, as shown in FIG. 5C.

Figure 5D:
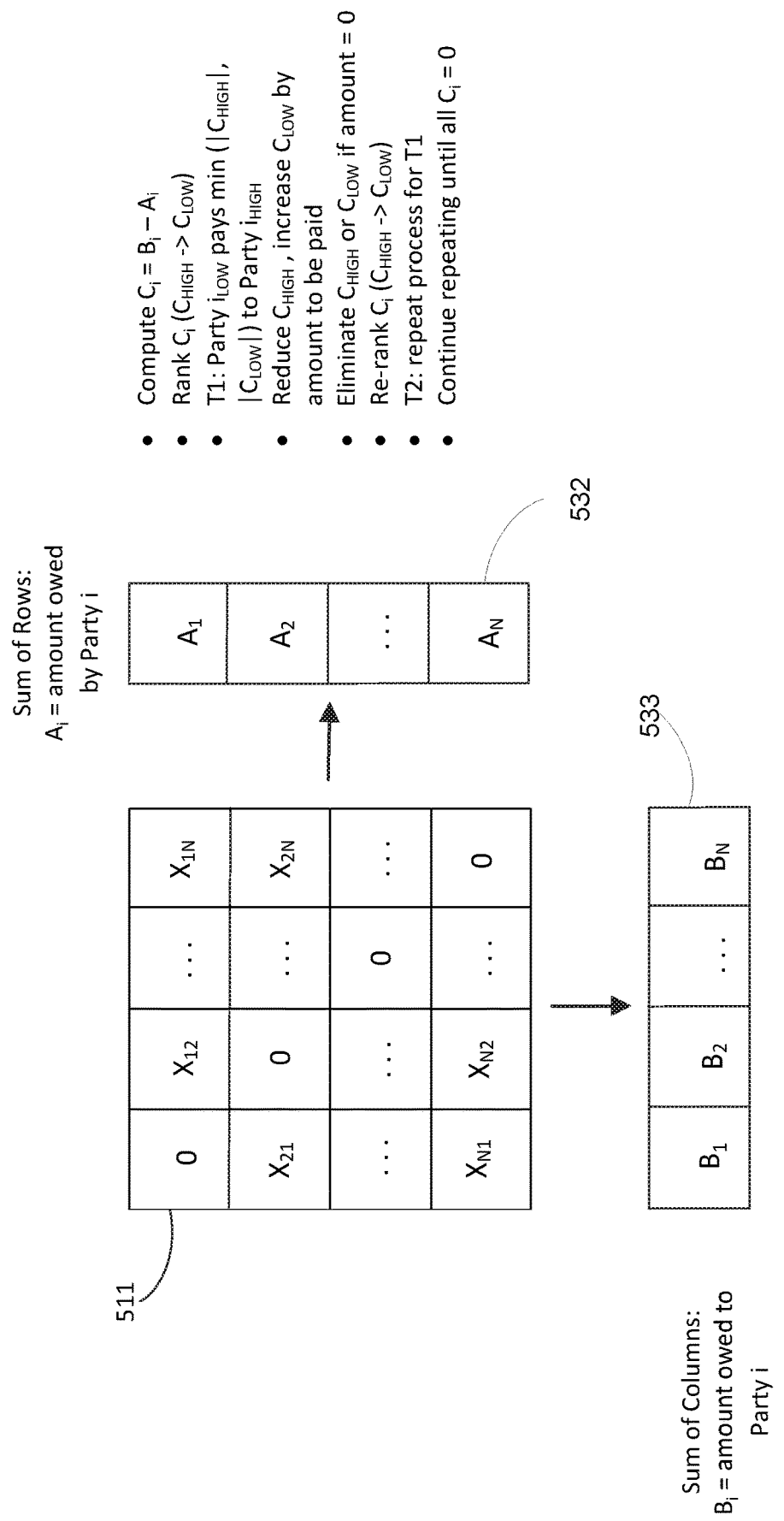

FIG. 5D illustrates an example of how optimizing transactional function $f_N(x)$ 522 may operate on input array 511, where the optimizing transactional function $f_N(x)$ minimizes the number of payments among the group of transacting parties. A sum of each row is tabulated in array 532, where $A_1=x_{12}+x_{13}+\ldots+x_{1N}$ provides the total amount owed by party 1 to the other transacting parties, $A_2=x_{21}+x_{23}+\ldots+x_{2N}$ provides the total amount owed by party 2 to the other transacting parties, etc.

Similarly, a sum of each column is tabulated in array 533, where $B_1=x_{21}+x_{31}+\ldots+x_{N1}$ provides the total amount owed to party 1 by the other transacting parties, $B_2=x_{12}+x_{32}+\ldots+x_{N2}$ provides the total amount owed by party 2 to the other transacting parties, etc.

Based on these tabulations as in array 532 and array 533, a known algorithm may be applied to determine how to minimize the number of settlement payments required to satisfy the amounts owed among the transacting parties. The algorithm may operate as follows:

(a) Compute $C_i=B_i-A_i$, for all i=(1,N). This provides, for each party i, the net amount owed to that party (if $C_i$ is positive) by the other parties, or the net amount owed by that party (if $C_i$ is negative) to the other parties.

(b) Eliminate any $C_i$ values that=0, and rank the remaining $C_i$ amounts from highest positive ($C_{HIGH}$) to highest negative ($C_{LOW}$).

(c) Assign payment $T_1$ from the party corresponding to $C_{LOW}$ to the party corresponding to $C_{HIGH}$. The amount of the payment $T_1$ will be the minimum of the absolute value of $C_{HIGH}$ and the absolute value of $C_{LOW}$: $T1=\min(|C_{HIGH}|, |C_{LOW}|)$.

(d) Reduce $C_{HIGH}$ and increase $C_{LOW}$ by the amount to be paid=$T_1$:

$C_{HIGH}=C_{HIGH}-T_1; C_{LOW}=C_{LOW}+T_1$.

(e) Eliminate any $C_i$ values that=0, and re-rank the remaining $C_i$ amounts from highest positive ($C_{HIGH}$) to highest negative ($C_{LOW}$).

(f) Repeat steps (c) through (e) until all amounts have been applied and all $C_i$ values are 0.

Figure 5E:
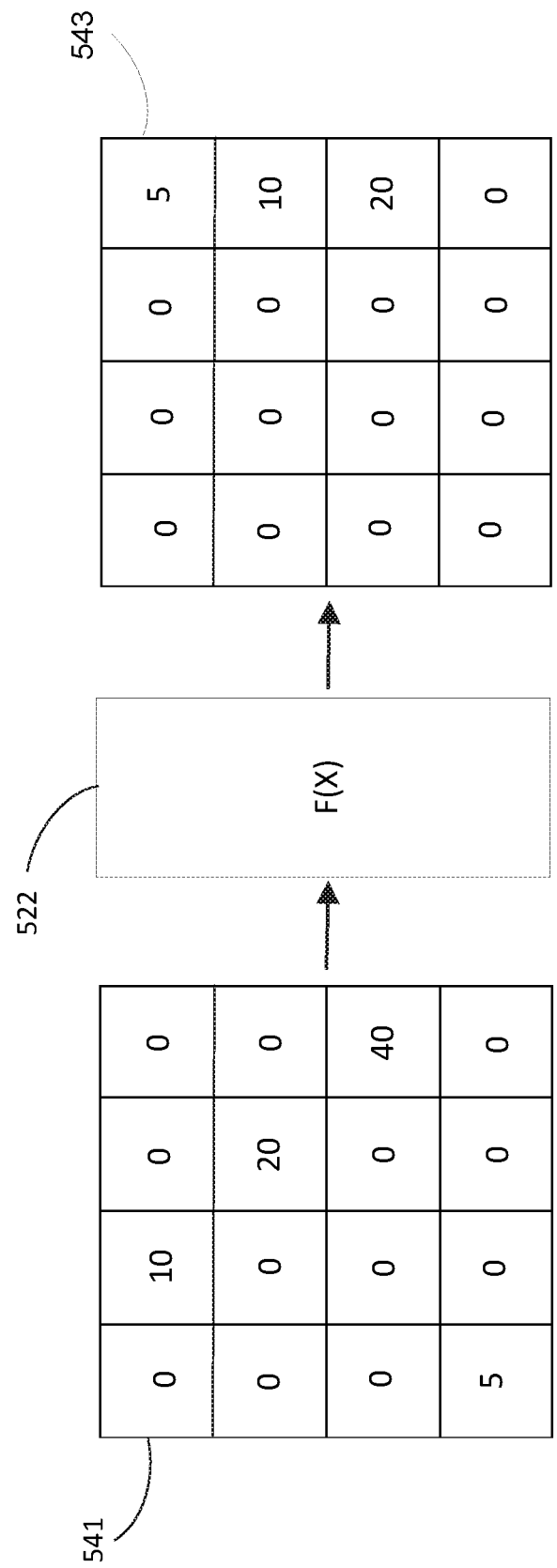
Figure 5F:
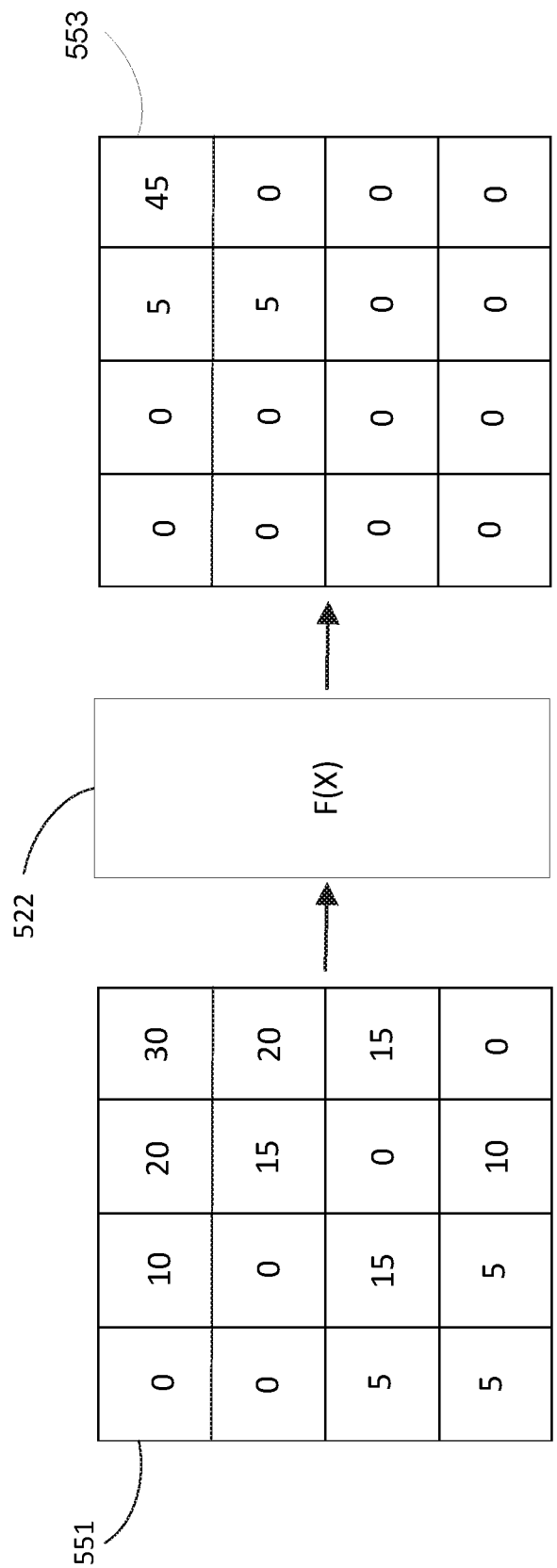

FIG. 5E illustrates an example applying optimizing transactional function $f_N(x)$ 522 on input array 541 to produce output array 543 for specific sample amounts, using the algorithm described above with reference to FIG. 5D. As shown for input array 541, party 1 owes party 2 $10, party 2 owes party 3 $20, party 3 owes party 4 $40, and party 4 owes party 1 $5. After applying the optimization transactional function, output array 543 shows that the resulting settlement payments have been minimized to a total of 3 transactions: party 1 pays $5 to party 4, party 2 pays $10 to party 4, and party 3 pays $20 to party 4; party 4 makes no payment to party 1. No other transactions are required to settle the debts among parties 1-4 in this example FIG. 5F illustrates a second example applying optimizing transactional function $f_N(x)$ 522 on input array 551 to produce output array 553 for specific sample amounts, using the algorithm described above with reference to FIG. 5D. For example, as shown for the input array in FIG. 5F, party 1 owes party 2 $10, party 3 $20, and party 4 $30. These are not net amounts of debt, since party 3 and party 4 each owe party 1 $5 as shown for input array 551. After applying the optimization transactional function, output array 553 shows that the resulting settlement payments have been minimized to a total of 3 transactions: party 1 pays $5 to party 3 and $45 to party 4, and party 2 pays $5 to party 3. No other transactions are required to settle the debts among parties 1-4 in this example.

Figure 6A:
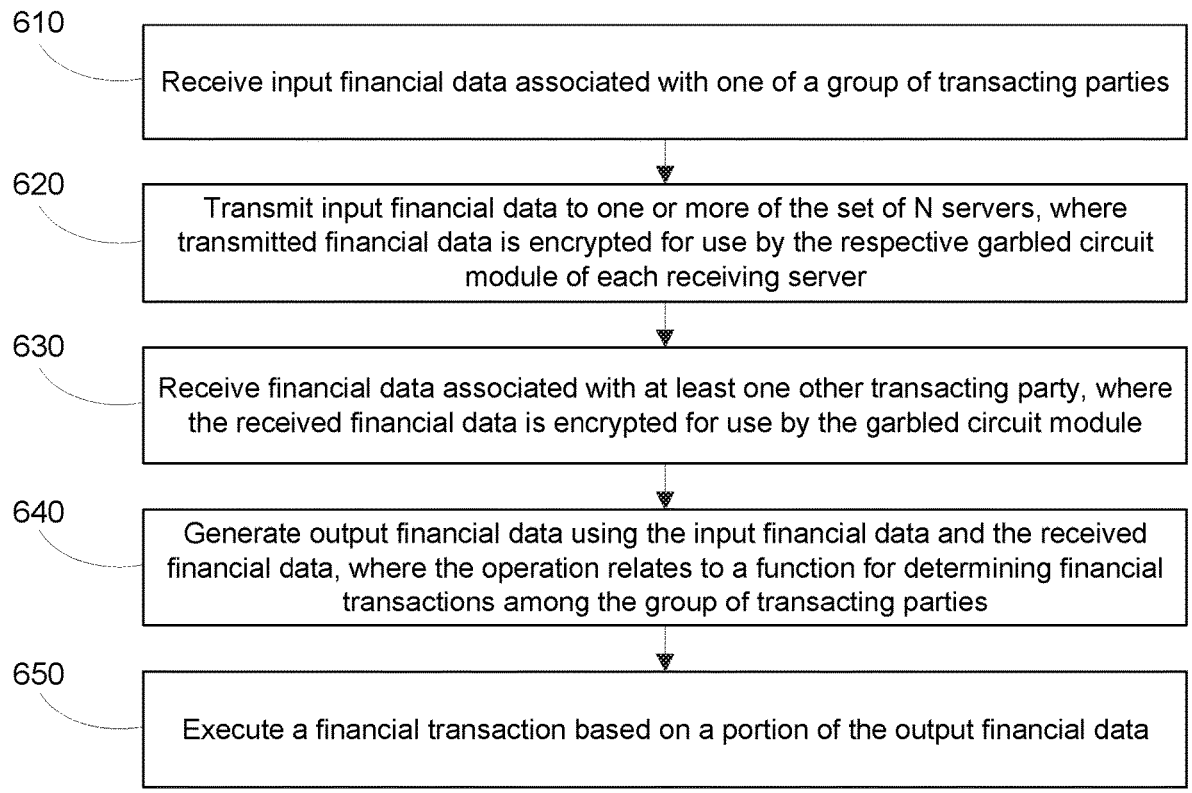
FIGS. 6A-6C provide a flowchart illustrating a method of performing a secure transaction function according to one or more example embodiments.

FIG. 6A provides a flowchart illustrating a method of performing a secure transaction function according to one or more example embodiments, with reference to components and features described above, including but not limited to the figures and associated description. Method 600 may be carried out by components of system 100 including, e.g., by server 200 via garbled circuit module 201 executing in conjunction with processor 202. Method 600 may be performed as part of a collective function carried out by a set of N distributed servers, each server having a garbled circuit module.

At block 610, input financial data is received. The input may be associated with one party of a group of transacting parties.

At block 620, at least a portion of the input financial data may be transmitted to one or more of the set of N distributed garbled circuit servers. The input financial data may be divided into multiple portions, and different portions of the input financial data may be transmitted to different servers of the set of N servers. Each transmitted input financial data portion may be encrypted for use by the respective garbled circuit module of the receiving server. The encryption may use the same key for all encrypted portions, or may use a different key for each encrypted portion transmitted.

At block 630, financial data associated with at least one other transacting party may be received from one or more of the set of N distributed garbled circuit servers. In some embodiments, multiple portions of financial data, each portion associated with a different other transacting party, may be received. Each received portion of financial data may be encrypted for use by the garbled circuit module of the server.

At block 640, output financial data may be generated by performing an operation using the input financial data and the received financial data (including any one or more of the received multiple portions of financial data). The operation may include a mathematical operation. The operation may relate to a function for determining a plurality of financial transactions among the group of transacting parties. The function for determining a plurality of financial transactions among the group of transacting parties may be related to the transactional function $f_N(x)$ described above with reference to FIG. 5.

At block 650, one or more financial transactions may be executed based on at least a portion of the generated output financial data. The one or more financial transactions may be related to one or more settlement payments between one transacting party and one or more other parties of the group of transacting parties.

Figure 6B:
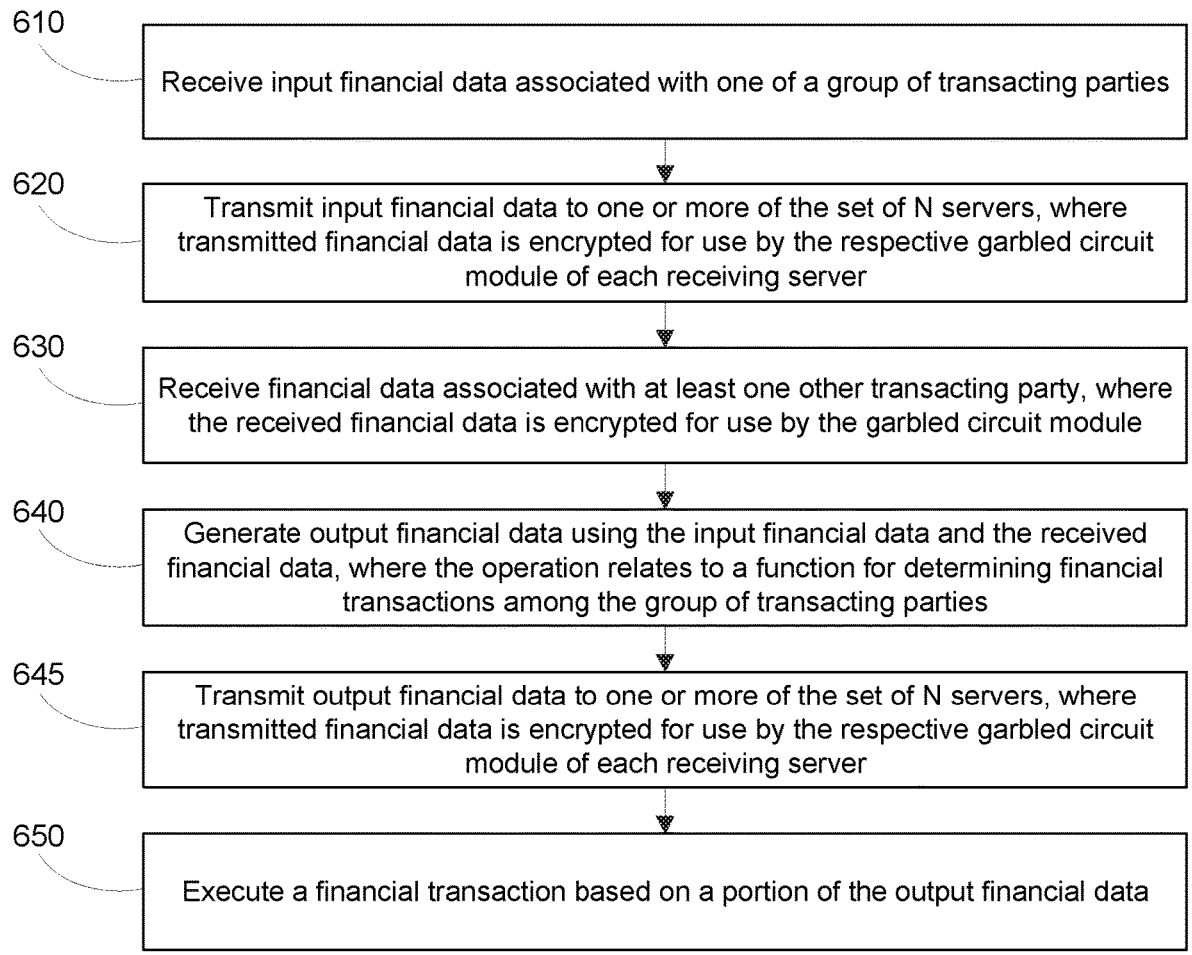

FIG. 6B provides a flowchart illustrating a method of performing a secure transaction function according to one or more example embodiments, with reference to components and features described above, including but not limited to the figures and associated description. Method 601 may be carried out by components of system 100 including, e.g., by server 200 via garbled circuit module 201 executing in conjunction with processor 202. Blocks 610-640 include the same activity described above with reference to method 600 of FIG. 6A; method 601 then proceeds to block 645.

At block 645, at least a portion of the output financial data may be transmitted to one or more of the set of N distributed garbled circuit servers. The output financial data may be divided into multiple portions, and different portions of the output financial data may be transmitted to different servers of the set of N servers. Each transmitted output financial data portion may be encrypted for use by the respective garbled circuit module of the receiving server. The encryption may use the same key for all encrypted portions, or may use a different key for each encrypted portion transmitted.

Block 650 includes the same activity described above with reference to method 600 of FIG. 6A.

Figure 6C:
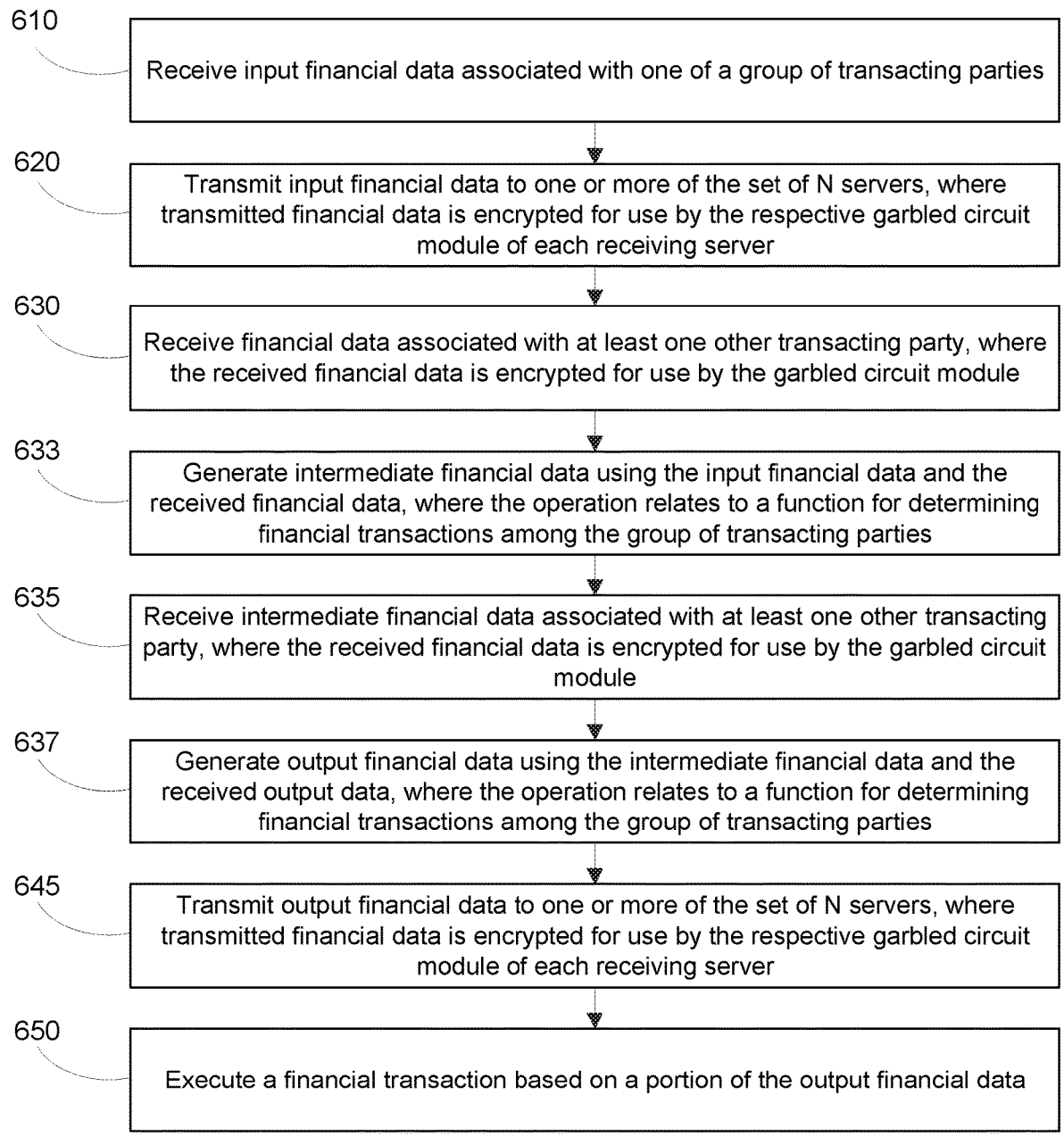

FIG. 6C provides a flowchart illustrating a method of performing a secure transaction function according to one or more example embodiments, with reference to components and features described above, including but not limited to the figures and associated description. Method 602 may be carried out by components of system 100 including, e.g., by server 200 via garbled circuit module 201 executing in conjunction with processor 202. Blocks 610-630 include the same activity described above with reference to method 600 of FIG. 6A or method 601 of FIG. 6B; method 602 then proceeds to block 633.

At block 633, intermediate financial data may be generated by performing an operation using the input financial data and the received financial data (including any one or more of the received multiple portions of financial data). The operation may include a mathematical operation. The operation may relate to a function for determining a plurality of financial transactions among the group of transacting parties. The function for determining a plurality of financial transactions among the group of transacting parties may be related to the transactional function $f_N(x)$ described above with reference to FIG. 5.

At block 635, intermediate financial data associated with at least one other transacting party and generated by at least one other garbled circuit module may be received from one or more of the set of N distributed garbled circuit servers. In some embodiments, multiple portions of intermediate financial data, each portion associated with a different other transacting party and generated by a different garbled circuit module, may be received. Each received portion of intermediate financial data may be encrypted for use by the garbled circuit module of the server.

At block 637, output financial data may be generated by performing an operation using the input financial data, the received financial data (including any one or more of the received multiple portions of financial data), the generated intermediate financial data, and/or the received intermediate financial data (including any one or more of the received multiple portions of intermediate financial data). The operation may include a mathematical operation. The operation may relate to a function for determining a plurality of financial transactions among the group of transacting parties. The function for determining a plurality of financial transactions among the group of transacting parties may be related to the transactional function $f_N(x)$ described above with reference to FIG. 5.

Block 645 includes the same activity described above with reference to method 601 of FIG. 6B.

Block 650 includes the same activity described above with reference to method 600 of FIG. 6A.

It will be understood that other garbled circuit modules of the set of garbled circuit modules may similarly perform operations involving some or all of the activities described above with reference to FIGS. 6A-6C, such that the set of N garbled circuit modules, executing on respective set of N garbled circuit servers, collectively perform a transactional function $f_N(x)$, and collectively determine a plurality of transactions among the group of N transactional parties. The plurality of transactions may be settlement payments to satisfy amounts owed among the group of N transactional parties.

In some embodiments, additional rounds of intermediate financial data resulting from the operations described may be transmitted among the set of N garbled circuit servers and used by the respective garbled circuit modules in performing additional operations to achieve output data.

In some embodiments, one of the garbled circuit modules may be configured, e.g., by the garbled circuit compiler, to begin executing it process first, before other garbled circuit modules begin their execution. In some embodiments, the garbled circuit modules may be configured, e.g. by the garbled circuit compiler, to execute in sequence, the sequence based on the function to be collectively performed; the sequence may be determined by the garbled circuit compiler. In some embodiments, each garbled circuit module may be configured to execute one or more instructions, but not a complete operation, and then await the performance of some instructions by at least one other garbled circuit compiler, before performing additional instructions, such that the garbled circuit modules may complete their operations in a sequence involving multiple passes among the set of garbled circuit modules. Such execution by the set of garbled circuit modules may involve multiple transmission of data values between and among the garbled circuit servers, including exchange of input values, intermediate values, and output values. As an example (N=4), the garbled circuit modules may execute in a sequence such as GC1, GC2, GC3, GC4, GC1, GC4, GC2, GC3; other sequences may be possible.

In some embodiments, the secure transactional system described herein may be operated on repeated or periodic intervals to establish a set of transactions to be executed among a group of transacting parties on a repeated or periodic basis. For example, the secure transactional system may be operated on daily, weekly or monthly intervals to establish a set of transactions to be executed among a group of transacting parties on a daily, weekly or monthly basis.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for secure distributed multi-party transaction processing, comprising:

a set of N distributed garbled circuit transaction servers, each server storing one or more private transactional data and configured for data communication with one or more of the other servers via a network, each server being associated with one of a group of N transacting parties, each server comprising a processor and a garbled circuit module comprising code for execution by the processor, the servers collectively and securely perform a transactional function relating to one or more transactions between or among two or more transacting parties of the group of N transacting parties using secure multi-party garbled circuit techniques:

N is an integer greater than 2, and the processor is configured to:

develop the transactional function for use in establishing one or more transactions between or among two or more transacting parties of the group of N transacting parties;

optimize the transactional function to obtain an optimized transactional function, the optimization being based on one or more optimization criteria including minimizing number of transactions to be made, minimizing total transaction costs for the transactions to be made, minimizing risk involved in carrying out the transactions, or maximizing speed at which the transactional function be performed;

compile, using a garbled circuit compiler, a programming code segment representing the optimized transactional function, into a Boolean expression expressed as a function of a plurality of private financial data stored across the N distributed transaction server;

generate a set of N garbled circuit modules;

distribute, over the network, the set of N garbled circuit modules among the N garbled circuit servers;

implement the Boolean expression corresponding to the optimized transactional function, across the set of N garbled circuit modules associated with the set of N distributed transaction servers;

wherein, for each server of the set of N servers, the respective garbled circuit module is configured to, when executed:

receive, from a transacting party of the group of N transacting parties, input data into data block of the respective garbled circuit module, the input data being private financial data associated with the transacting party;

apportion the input data into N−1 individual portions corresponding to other N−1 garbled circuit modules of the set of N garbled circuit modules;

combine each individual portion of the N−1 individual portions with a pair of corresponding random strings using a logical operator to generate N−1 individual random strings in replace of the N−1 individual portions, and further encrypt the generated N−1 individual random strings to obtain encrypted N−1 individual random strings, such that a true value of each individual portion is not known to other N−1 transacting parties of the group of N transacting parties;

transmit, via the network, the encrypted N−1 individual random strings to the other N−1 garbled circuit modules running on other N−1 servers of the set of N servers, the encrypted N−1 individual random strings being for use by the respective garbled circuit module of each receiving server;

receive, via the network, one or more private financial data associated with at least one other transacting party from at least one other server of the set of N servers, said received one or more private financial data encrypted for use by the garbled circuit module associated with the at least one other server of the set of N servers; and perform an operation to calculate an output financial data value using the private input financial data and the received private financial data, the output financial data value being obtained by mapping random strings corresponding to the output financial data value to the pair of random strings corresponding to the input data, and wherein, the processor executes a financial transaction based on a portion of the output financial data relating to the one of the plurality of transacting parties.

2. The system of claim 1, wherein the respective garbled circuit module is further configured to, when executed:
transmit, via the network, at least a portion of the output financial data to at least one other server of the set of N servers, said transmitted output financial data encrypted for use by the respective garbled circuit module of each receiving server.

3. The system of claim 2, wherein the respective garbled circuit module is further configured to, when executed:
receive, via the network, output financial data from at least one other server of the set of N servers, said received output financial data encrypted for use by the garbled circuit module.

4. The system of claim 3, wherein performing an operation to obtain output financial data value further includes using the received output financial data.

5. The system of claim 1, wherein the plurality of transacting parties comprises a plurality of financial institutions.

6. The system of claim 1, wherein the optimized transactional function comprises a function for determining a settlement payment to be made by each of the plurality of transacting parties to each other of the plurality of transacting parties to satisfy amounts owed among the plurality of transacting parties.

7. The system of claim 6, wherein the function for determining the settlement payment to be made by each of the plurality of transacting parties to each other of the plurality of transacting parties is optimized to minimize the number of settlement payments required among the plurality of transacting parties.

8. The system of claim 6, wherein the function for determining the settlement payment to be made by each of the plurality of transacting parties to each other of the plurality of transacting parties is optimized to minimize the total transaction cost associated with the settlement payments required among the plurality of transacting parties.

9. The system of claim 1, wherein the respective garbled circuit module is further configured to, when executed:
perform a transactional operation in a sequence dependent upon a transactional operation performed by the respective garbled circuit module of at least one other server of the set of N servers.

10. The system of claim 9, wherein the respective garbled circuit module is further configured to, when executed:
initiate performing the transactional operation prior to the performing of transactional operations by any other of the garbled circuit modules of the other servers of the set of N servers.

11. A method for optimizing transaction processing in a distributed multi-party transactional environment, wherein the method is performed in a set of N distributed garbled circuit transaction servers, each server storing one or more private transactional data and configured for data communication with one or more of the other servers via a network, each server being associated with one of a group of N transacting parties, each server comprising a processor and a garbled circuit module comprising code for execution by the processor, the servers collectively and securely perform a transactional function relating to one or more transactions between or among two or more transacting parties of the group of N transacting parties using secure multi-party garbled circuit techniques, the method comprising:
developing the transactional function for use in establishing one or more transactions between or among two or more transacting parties of the group of N transacting parties;

optimizing the transactional function to obtain an optimized transactional function, the optimization being based on one or more optimization criteria including minimizing number of transactions to be made, minimizing total transaction costs for the transactions to be made, minimizing risk involved in carrying out the transactions, or maximizing speed at which the transactional function be performed, the optimized transactional function using a plurality of input parameters corresponding to one or more transactional data values associated with each of the group of transacting parties in the set of N distributed garbled circuit transaction servers, wherein the one or more transactional data values associated with each transacting party is stored on a corresponding server configured with a garbled circuit module;

converting the optimized transactional function into a Boolean expression using a garbled circuit compiler to generate a set of N garbled circuit modules, the Boolean expression comprising a plurality of logical operations distributed to each of the set of N garbled circuit modules associated with the group of transacting parties;

distributing, over the network, the set of N garbled circuit modules among the N garbled circuit servers;

receiving, from a transacting party of the group of N transacting parties, input data into data block of the respective garbled circuit module, the input data being private financial data associated with the transacting party;

apportioning the input data into N−1 individual portions corresponding to other N−1 garbled circuit modules of the set of N garbled circuit modules;

combining each individual portion of the N−1 individual portions with a pair of corresponding random strings using a logical operator to generate N−1 individual random strings in replace of the N−1 individual portions, and further encrypt the generated N−1 individual random strings to obtain encrypted N−1 individual random strings, such that a true value of each individual portion is not known to other N−1 transacting parties of the group of N transacting parties;

transmitting, via the network, the encrypted N−1 individual random strings to the other N−1 garbled circuit modules running on other N−1 servers of the set of N servers, the encrypted N−1 individual random strings being for use by the respective garbled circuit module of each receiving server;

communicating, by the set of N garbled circuit modules, the one or more transactional data values, associated with each of the group of transacting parties, to one or more other transaction parties, in accordance to the plurality of logical operations distributed to each server;

computing, by each of set of N garbled circuit modules, an optimal output value using the one or more transactional data values, received via a corresponding garbled circuit module;

calculating, using a plurality of optimal output values, a solution comprising an output data array, the output data array comprising a settlement amount to be paid to each of the transacting parties, and the output data array being obtained by mapping random strings corresponding to the output data array to the pair of random strings corresponding to the input data; and executing a plurality of settlement transactions, each of the settlement transactions comprising a payment of the settlement amount to one or more of the transacting parties.

12. The method of claim 11, wherein the method further comprises the steps of:
transmitting, via the network, at least a portion of the optimal output data to at least one other server of the set of N servers, said transmitted optimal output data encrypted for use by the respective garbled circuit module of each receiving server.

13. The method of claim 12, wherein the method further comprises the steps of:
receiving, via the network, optimal output data from at least one other server in the distributed multi-party transactional environment, said received optimal output data encrypted for use by the garbled circuit module.

14. The method of claim 13, wherein performing an operation to obtain the optimal output data by a garbled circuit module of a server further includes using the optimal output data received from the at least one other server in the multi-party transactional environment.

15. The method of claim 11, wherein the plurality of transacting parties comprises a plurality of financial institutions.

16. The method of claim 11, wherein the one or more transactional data values associated with each of a plurality of transacting parties in the distributed transaction environment comprise one or more payment values owed by each transacting party to one or more other transacting parties in the distributed multi-party transactional environment, and wherein the optimizing transactional function is configured for determining a plurality of financial transactions between the plurality of transacting parties including a settlement payment to be made by each of the plurality of transacting parties to each other of the plurality of transacting parties to satisfy amounts owed among the plurality of transacting parties.

17. The method of claim 11, wherein the one or more optimization criteria for developing the optimizing transaction function corresponds to minimizing the number of settlement payments required among the plurality of transacting parties.

18. The method of claim 11, wherein the one or more optimization criteria corresponds to minimizing a total transaction cost associated with the settlement payments required among the plurality of transacting parties.

19. The method of claim 11, wherein the method further comprises the steps of:
performing a transactional operation in a sequence dependent upon a transactional operation performed by the respective garbled circuit module of at least one other transacting server of the plurality of transacting servers in the distributed multi-party transactional environment.

20. A computer readable non-transitory medium comprising computer executable instructions that, when executed in a set of N distributed garbled circuit transaction servers, each server storing one or more private transactional data and configured for data communication with one or more of the other servers via a network, each server being associated with one of a group of N transacting parties, each server comprising a processor and a garbled circuit module comprising code for execution by the processor, the servers collectively and securely perform a transactional function relating to one or more transactions between or among two or more transacting parties of the group of N transacting parties using secure multi-party garbled circuit techniques, cause the set of N distributed garbled circuit transaction servers to perform procedures comprising the steps of:
developing the transactional function for use in establishing one or more transactions between or among two or more transacting parties of the group of N transacting parties;

optimizing the transactional function to obtain an optimized transactional function, the optimization being based on one or more optimization criteria including minimizing number of transactions to be made, minimizing total transaction costs for the transactions to be made, minimizing risk involved in carrying out the transactions, or maximizing speed at which the transactional function be performed, the optimized transactional function using a plurality of input parameters corresponding to one or more transactional data values associated with each of the group of transacting parties in the set of N distributed garbled circuit transaction servers, wherein the one or more transactional data values associated with each transacting party is stored on a corresponding server configured with a garbled circuit module;

converting the optimized transactional function into a Boolean expression using a garbled circuit compiler to generate a set of N garbled circuit modules, the Boolean expression comprising a plurality of logical operations distributed to each of the set of N garbled circuit modules associated with the group of transacting parties;

distributing, over the network, the set of N garbled circuit modules among the N garbled circuit servers;

receiving, from a transacting party of the group of N transacting parties, input data into data block of the respective garbled circuit module, the input data being private financial data associated with the transacting party;

apportioning the input data into N−1 individual portions corresponding to other N−1 garbled circuit modules of the set of N garbled circuit modules;

combining each individual portion of the N−1 individual portions with a pair of corresponding random strings using a logical operator to generate N−1 individual random strings in replace of the N−1 individual portions, and further encrypt the generated N−1 individual random strings to obtain encrypted N−1 individual random strings, such that a true value of each individual portion is not known to other N−1 transacting parties of the group of N transacting parties;

transmitting, via the network, the encrypted N−1 individual random strings to the other N−1 garbled circuit modules running on other N−1 servers of the set of N servers, the encrypted N−1 individual random strings being for use by the respective garbled circuit module of each receiving server;

communicating, by the set of N garbled circuit modules, the one or more transactional data values, associated with each of the group of transacting parties, to one or more other transaction parties, in accordance to the plurality of logical operations distributed to each server;

computing, by each of set of N garbled circuit modules, an optimal output value using the one or more transactional data values, received via a corresponding garbled circuit module;

calculating, using a plurality of optimal output values, a solution comprising an output data array, the output data array comprising a settlement amount to be paid to each of the transacting parties, and the output data array being obtained by mapping random strings corresponding to the output data array to the pair of random strings corresponding to the input data; and executing a plurality of settlement transactions, each of the settlement transactions comprising a payment of the settlement amount to one or more of the transacting parties.

* * * * *